No. 694,388. Patented Mar. 4, 1902.
R. KAUCHER.
BICYCLE ATTACHMENT.
(Application filed June 22, 1901.)
(No Model.)
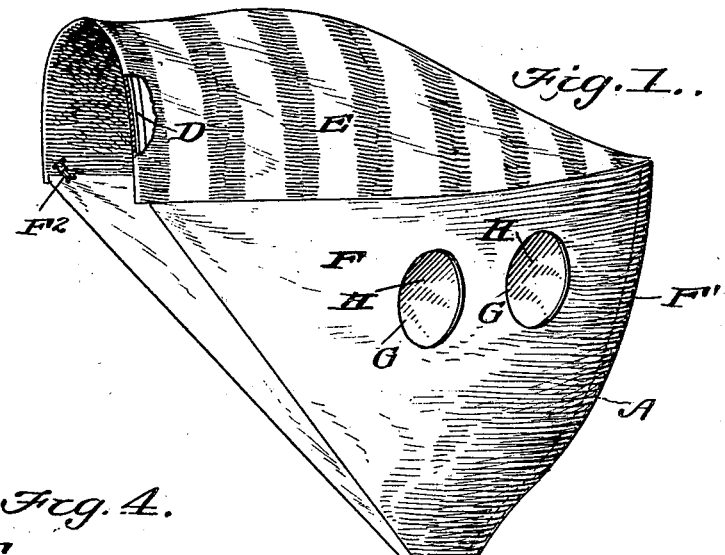
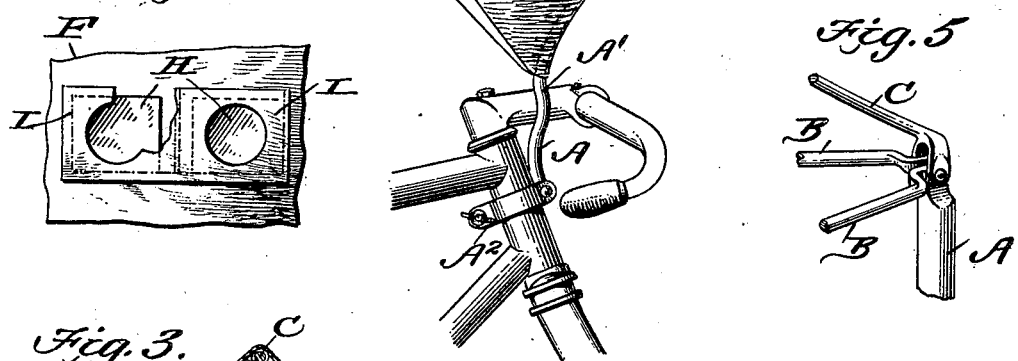
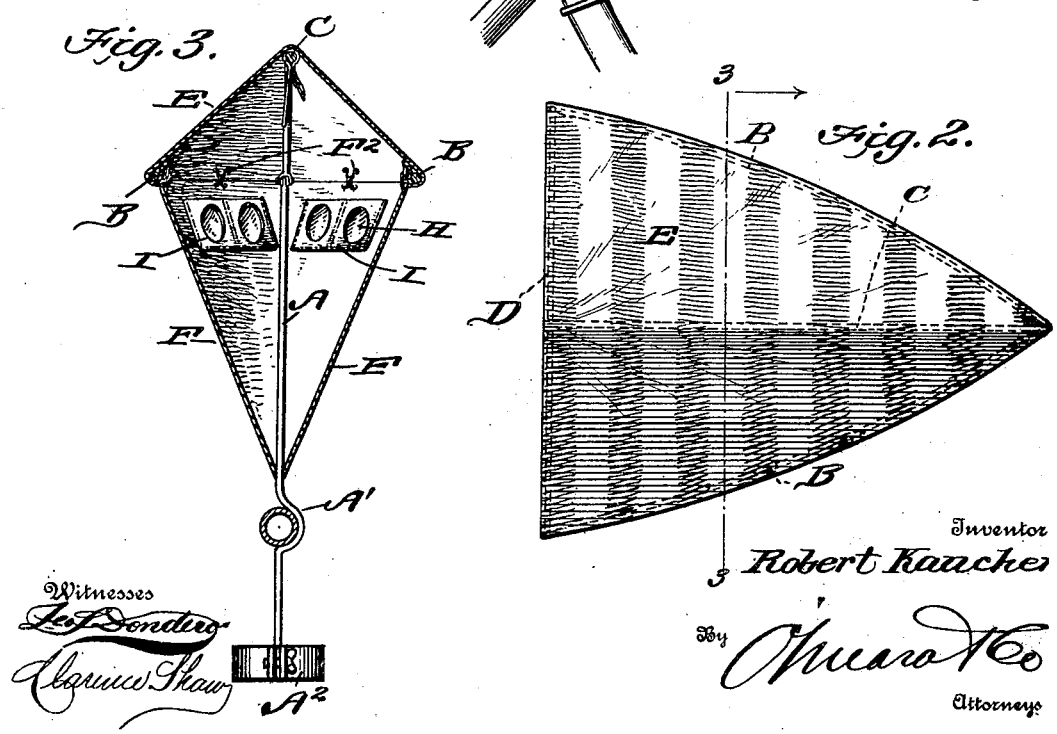

UNITED STATES PATENT OFFICE.

ROBERT KAUCHER, OF ROCHESTER, NEW YORK.

BICYCLE ATTACHMENT.

SPECIFICATION forming part of Letters Patent No. 694,388, dated March 4, 1902.

Application filed June 22, 1901. Serial No. 65,690. (No model.)

*To all whom it may concern:*

Be it known that I, ROBERT KAUCHER, a citizen of the United States, residing at Rochester, in the county of Monroe and State of New York, have invented a new and useful Bicycle Attachment, of which the following is a specification.

This invention is an improved bicycle attachment, the object being to provide a parasol or hood attachment for bicycles for the purpose of protecting the rider from sun and rain.

Another object of the invention is to provide a hood or canopy attachment which will thoroughly protect the upper portion of the rider and at the same time give a clear vision, so as not to interfere with the steering of the bicycle.

With these objects in view the invention consists, essentially, of a light wire frame supported by means of a rod attached to the frame of the bicycle, said frame supporting a canopy adapted to protect the rider from the rays of the sun, and a hood attachment to be used in connection with the canopy for the purpose of protecting the head and shoulders of the rider from the rain, said hood being provided with sight-openings, so as to give the rider a view of the path in advance of the machine.

The invention consists also of certain details of construction and novelties of combination, all of which will be fully described hereinafter and pointed out in the claims.

In the drawings forming part of this specification, Figure 1 is a view showing the practical application of my invention. Fig. 2 is a top plan view of the attachment. Fig. 3 is a section on the line 3 3 of Fig. 2. Fig. 4 is an enlarged detail view of the sight-openings and pockets for retaining the transparent covering, and Fig. 5 is a detail perspective view illustrating the construction of the frame.

In carrying out my invention I employ an upright bar A, which is attached to a clip $A^2$, by means of which the bar is rigidly secured to the front member of the bicycle-frame. The bar A is of thin tubular material and may be bent or curved forwardly, as shown, so as to permit the rider to lean forward if so desired. It will also be noted that I have shown my invention applied to a bicycle provided with a handle-bar extension, and the upright bar A is curved, as shown at A', to accommodate the said handle-bar extension. Side bars B are pivoted at their forward ends to the upper end of the upright bar A, and a top bar C is also connected at its forward end to the upper end of the bar A, one pivot serving to connect the upright bar, side bars, and the top bar. The side bars and the top bar are connected at their ends by means of a bow D, and these bars may also be connected intermediate their ends by a similarly-constructed bow, if so desired. The shape of the frame constructed by means of the side and top bars and bows is essentially triangular and is covered by means of a canopy E, of any suitable fabric, preferably of awning-cloth, the said fabric being attached to the side bars, top bar, and cross-bows in any suitable manner.

F indicates the hood portion of the attachment, which consists, essentially, of two triangular-shaped side flaps united at their forward edges and attached to the upright bar A, as shown at F', the upper edges of the side flaps being attached to the canopy by means of hooks and eyes $F^2$; but any other suitable form of attachment may be employed, if so desired. The hood portion F may be formed of the same material as the canopy portion E, or it can be formed of any suitable waterproof material and is preferably constructed with sight-openings G, adjacent to the forward end, and in practice I prefer to arrange plates H, of glass, celluloid, or other transparent material, upon the inner sides of the flaps F, opposite the openings G, for the purpose of preventing rain passing into the interior of the hood, the said plates of glass or other transparent material being held in the pockets I, sewed upon the inner faces of the side flaps of the hood, said pockets having openings alining with the openings in the side flaps, as most clearly illustrated in Figs. 3 and 4.

The canopy E is used for the purpose of protecting the rider from the rays of the sun, and the hood portion F is used in connection with the canopy portion for the purpose of protecting the rider from rain and storm, and when the hood portion is not in use it can be folded or rolled and carried around the upright bar or upon the inner side of the canopy, as preferred.

The entire device is constructed of the thinnest and lightest material consistent with strength, and the shape of the canopy and hood is such as to render very little resistance to the air.

Having thus fully described my invention, what I claim as new, and desire to secure by Letters Patent, is—

1. A bicycle attachment comprising an upright supporting-bar, an essentially triangular-shaped frame connected at its forward end to the upper end of said supporting-bar, a canopy attached to said frame, and a hood composed of two flaps attached to the supporting-bar at their front edges and connected to the canopy and frame at their upper edges, substantially as set forth.

2. A bicycle attachment comprising an upright supporting-bar, an essentially triangular-shaped frame connected at its forward end to the upper end of said supporting-bar and the canopy attached to said frame and a hood composed of two flaps attached to the supporting-bar at their front edges and connected to the canopy and frame at their upper edges, said hood extending substantially the entire length of the supporting-bar and provided with side openings in its upper portion, substantially as set forth.

3. A bicycle attachment comprising an upright supporting-bar, the diverging side bars and the central top bar connected at their forward ends to the upper end of the supporting-bar, the central bar being elevated above the side bars, the cross bars or bows connecting the side and central bars and the canopy extending over and attached to the side and central bars and cross bars or bows, substantially as set forth.

4. A bicycle attachment comprising the upright bar, the side bars pivoted at their forward ends to the upper end of the upright bar, the top bar pivoted at its forward end to the upper end of the upright bar, the connecting cross-bows for connecting the side and top bars, the canopy extending over the top and side bars and bows and connected thereto, and the hood comprising the two side flaps, each provided with sight-openings having pockets adapted to receive the transparent plates for protecting the said sight-openings, all arranged and adapted to operate substantially as described.

ROBERT KAUCHER.

Witnesses:
  CHAS. H. SIBBITT,
  JOHN H. HANDLEY.